United States Patent Office 2,959,562
Patented Nov. 8, 1960

2,959,562

MIXED CHLORINATION PRODUCTS FROM LOW PRESSURE POLYETHYLENE AND HYDROCARBONS AND A PROCESS FOR PREPARING SAID PRODUCTS

Helmut Klug, Gersthofen, near Augsburg, Germany, assignor to Farbwerke Hoechst Aktiengesellschaft vormals Meister Lucius & Bruning, Frankfurt am Main, Germany, a corporation of Germany No Drawing. Filed Oct. 15, 1956, Ser. No. 615,748

Claims priority, application Germany Oct. 18, 1955

13 Claims. (Cl. 260—33.8)

This invention relates to the manufacture of mixed chlorination products from low pressure polyethylenes and hydrocarbons.

Various processes are known which enable the known polyethylenes obtained by a high or medium pressure synthesis to be converted into the corresponding halogenation or chlorination products. Similar compounds which have pronounced elastic properties and, therefore, are suitable as caoutchouc substitutes can be obtained from the above polyethylenes by sulfochlorination and subsequent vulcanization using inorganic agents.

It is a well known fact that such halogenation or sulfohalogenation processes are beset with various difficulties. Especially inconvenient in this respect is the viscosity of the reaction products which strongly increases with the degree of chlorination.

The halogenation or chlorination process can be simplified as is known by operating in the presence of a suitable inert diluent, such as carbon tetrachloride, but on the other hand the separation of such solvents renders the process very difficult due to the bad diffusion of the solvent from the chlorinated polymer. Accordingly, it has also been suggested to dissolve low molecular polyolefins, especially polypropylene in a higher boiling solvent, for example in paraffin-hydrocarbons, then to chlorinate the mixture obtained and, without further separation, to use said mixture directly for purposes for which the presence of chlorinated paraffins appears desirable.

This process which may directly be applied to polyethylenes obtained by a high or medium pressure synthesis does however not extend to polyethylenes produced by a low pressure synthesis in the presence of organo-metal compounds as catalysts.

These latter polyethylenes have a straight chain structure and a relatively uniform molecular order (cf. Ind. Eng. Chem. 1955, IV, 11 A) and therefore consist of about 90% of crystallites so that they are practically not dissolved by aliphatic and aromatic hydrocarbons at a temperature up to 70° C. (cf. Chem. Eng. Progr. 1955, VI, page 251). Moreover, for the reasons set forth above, the polyethylenes have a very narrow solubility within the temperature range of 90 to 130° C.

Now we have found, that chlorine, when introduced into a suspension of the aforesaid low pressure polyethylenes in paraffinic and/or cycloparaffinic hydrocarbons, which term here and below shall include the terpenes, and/or aromatic hydrocarbons and/or chlorination products of said compounds which are liquid at the reaction temperature, reacts in the same manner with the polymeric and low molecular hydrocarbons although the high molecular (solid) reactant undergoes reaction solely at its surface. However, just a mixture of the aforesaid type surprisingly undergoes a far more vigorous reaction than, for example, higher melting paraffins alone which are known to react rather slowly, so that even inflammation may occur. In order to warrant the constancy of performance it is, therefore, advisable first to chlorinate the low molecular hydrocarbon component to a more or less high degree, i.e. to about 20–50%, preferably 30 to 45%, and then to add the polyethylene proportion in powder form.

The polyethylene grains are first completely insoluble and swell to a small extent upon the addition of a further quantity of chlorine; above 70° C., especially within a temperature range of 90 to 130° C. they dissolve conspicuously rapidly in proportion with the absorption of chlorine to form a clear solution.

It can easily be found by analysis that the polymeric body which may be isolated by repeated redissolution and reprecipitation with trichlorethylene or petroleum ether, has absorbed an amount of chlorine comparable with that taken up by the low molecular component.

It is evident that the great variety of polyethylenes obtained by a low pressure synthesis—the molecular weights generally are within the range of 10,000 to 2,000,000 or under circumstances outside this range, yield a plurality of more or less viscous halogenation products whose consistency depends to a large degree on the quantity of polyethylene added calculated upon the starting suspension (1–50%, preferably 10–25%). The polyethylene may be also added in a proportion outside the range indicated above and may be, for example, less than 1% when a high molecular compound is concerned, or more than 50% in the case where a relatively low molecular compound is concerned. Further graduations are given by varying the chlorine content of the reaction products which may be below 40% but may easily be allowed to increase to more than 40% and even up to 80%, or by the choice of the low molecular starting material. As low molecular starting materials there may be used, for example, liquid or solid commercial paraffin hydrocarbons of mineral origin which are solid below the reaction temperature and/or with the same success, the analogous synthetic products obtained by hydrogenating carbon monoxide. As suitable representatives are mentioned, more especially, toluene, xylene, naphthalene, diphenyl, ditoluyl, dixylyl, cumene, cymene, ethyl benzene or other alkyl benzenes or cyclohexane, methylcyclohexane, pinene, carene, dipentene, limonene, menthane, tetra- and decahydronaphthalene or other hydrogenation products of the aforesaid aromatic compounds. As aliphatic hydrocarbons there may be used, for example, hexane, heptane, octane, nonane, decane, dodecane, tetradecane, hexadecane, octadecane, etc. or hydrocarbon fractions obtained, for example, by petroleum distillation or hydrogenation of carbon monoxide, which are still liquid under the conditions applied, that is at a temperature above 70° C. under atmospheric or a raised pressure.

It must be noted that already a small proportion of polyethylene, for example 10% or much less, especially where a polyethylene with a very high polymerization degree is concerned is sufficient to give the chlorinated end material, that is the mixture of chlorinated polyethylene and chlorinated low molecular hydrocarbon, a preponderant thermoplastic character. The chlorination products are therefore suitable for use not only in the field of the chloroparaffins, for example as caoutchouc substitutes, raw materials for lacquers or as impregnating agents, but also as plasticizers in plastic mixtures and as cheap substituents for thermoplasts themselves, for example in the production of adhesive or coating layers and in the production of emulsion-like binding agents.

In this respect it should also be noted that in the manufacture of especially viscous products obtained, for example, from high molecular polyethylenes of the type described above and from higher melting paraffinic, cycloparaffinic or aromatic hydrocarbons which are normally solid at room temperature, it may sometimes be advisable to operate in the presence of an inert, preferably a perhalogenated diluent—a process which of course involves the above disadvantages; as suitable diluents there may be mentioned carbon tetrachloride or chloroform (the major part of which is further halogenated) or fluorochlorohydrocarbons, such as 1.1.2-trifluorotrichlorethane, difluorotetrachlorethane, dichlorotetrafluorethane or other compounds which are liquid under the reaction conditions. It is obvious that other modifications which are known from the chlorination of paraffins may be extended to the process of this invention. Thus, for example, the chlorination may be influenced with the aid of catalytic means such as radiation with ulta-violet light or by the addition of radical forming substances, such as azoisobutyronitrile, dibenzoyl peroxide or ditoluyl peroxide, or by the application of pressure, preferably up to a pressure of 20 atmospheres (gauge) or even higher.

The following examples illustrate the invention:

Example 1

80 kg. of a liquid 37.3% chlorinated hydrocarbon, obtained by chlorination of a hydrogenation product of carbon monoxide with a boiling range of 180–250° C., are introduced into an enamelled vessel resistant to the action of chlorine and mixed, while stirring, with 5.1 kg. of a fine granular polyethylene having an average molecular weight of about 30,000. Chlorine is then introduced at a rate of 3 kg./hour and the vessel is externally heated to 90° C. unless the heat evolved by the exothermal reaction is sufficient.

It is found that the polyethylene grains first undergo a swelling and then disperse in the chlorinated hydrocarbon within 10 hours to form a completely homogeneous solution. After the formation of a product chlorinated to about 45%, chlorination is continued for a further 12 hours and the nearly colorless ropy melt is then withdrawn while still hot.

The product so obtained readily dissolves in esters, aromatic hydrocarbons, chlorinated hydrocarbons and terpenes and has a viscosity of 11,100 centipoises—determined at 60° C. with a Hoppler viscosimeter as used in industry. A sample of the reaction product was repeatedly redissolved with trichlorethylene and subsequently precipitated with petroleum ether. The chlorinated polyethylene so isolated, contained about 39 percent of chlorine.

Example 2

A suspension prepared from 100 kg. of a liquid 40% chlorinated hydrocarbon, obtained by chlorination of a hydrogenation product of carbon monoxide with a boiling range of 230–300° C. and from 6.1 kg. of a fine granular polyethylene (average molecular weight 250,000) is introduced into an apparatus as described in Example 1. Chlorine is then added and the temperature is gradually raised from 9 to 110° C. The resulting product is withdrawn after a chlorine content of 50% has been reached; it is completely homogeneous, tensile and has an excellent thermoplastic nature. Its solubility corresponds to that of the product described in Example 1.

Example 3

A suspension of 3.3 kg. of polyethylene with an average molecular weight of 80,000 in 50 kg. of commercial diphenyl is treated as described in the preceding examples with chlorine at a temperature which is gradually raised from 80 to 130° C. After 8 days, a honey-yellow completely homogeneous and tough-elastic product is obtained which tends to the formation of coherent films and has a chlorine content of 58.5%.

Example 4

The chlorination apparatus described in the preceding examples is provided with an ultra-violet burner and two reflux condensers charged with water and brine, respectively. 50 kg. of carbon tetrachloride and 2 kg. of polyethylene having an average molecular weight of 30,000 are then introduced 20 kg. of cake paraffin having a melting and dropping point of 52/54° C. are added and the mixture is heated under reflux until the paraffin has been dissolved.

Already after a 24 hours introduction of chlorine, the polyethylene proportion enters into solution which becomes increasingly transparent. After 11 days, the mixture practically ceases to absorb further amounts of chlorine. The carbon tetrachloride is removed by distillation finally under reduced pressure and the snow-white, brittle mass retained which has a chlorine content of 77.6% is then pulverized. The mass obtained has a melting and dropping point of 150–180° C. It is readily soluble in chlorinated hydrocarbons, especially in trichlorethylene, and in aromatic hydrocarbons. The product produced is partially compatible with ketones and is especially suitable as raw material for producing lacquers.

The mixed chlorination products obtained by the process of this invention are suitable as adhesives, especially for paper, and as impregnating agents, for example to protect articles against putrefaction or the action of water, or to increase the flame-proofing, for example of fabrics. They are also suitable as starting materials for the production of lacquers and/or varnishing resins.

I claim:

1. A halogenation process which comprises chlorinating a suspension of low pressure polyethylene in a liquid medium selected from the group consisting of paraffinic hydrocarbons of at least six carbon atoms, cycloparaffinic hydrocarbons of at least six carbon atoms, aromatic hydrocarbons of at least seven carbon atoms containing one to two aromatic nuclei, and chlorination products of said hydrocarbons, said polyethylene having a linear molecular structure and a high degree of crystallinity, whereby a chlorination product is formed which consists of a mixture of chlorinated polyethylene and chlorinated hydrocarbon of the aforesaid group.

2. Process of claim 1 wherein gaseous chlorine is employed in the chlorination step.

3. Process of claim 1 wherein said halogenation product has a chlorine content of 40–80% by weight.

4. Process of claim 1 wherein the polyethylene has a molecular weight between 10,000 and 2,000,000.

5. Process of claim 1 wherein the suspension contains 1–50% polyethylene by weight.

6. Process of claim 1 wherein chlorination is conducted at a temperature in the range of 90–130° C.

7. Process of claim 1 wherein the reaction mixture includes a perhalogenated diluent in which the halogen is selected from the group consisting of chlorine and fluorine.

8. Process of claim 1 wherein chlorination is conducted under a pressure of up to 20 atmospheres.

9. Process of claim 1 wherein chlorination is conducted under the influence of ultraviolet light.

10. Process of claim 1 wherein chlorination is conducted in the presence of radical-forming agents.

11. A halogenation process which comprises chlorinating by means of gaseous chlorine a suspension of 1 to 50% by weight low pressure polyethylene in a liquid medium selected from the group consisting of paraffins of at least six carbon atoms, cycloparaffins of at least six carbon atoms, aromatic hydrocarbons of at least seven carbon atoms containing one to two aromatic nuclei, and chlorination products of said hydrocarbons, said polyethylene having a linear molecular structure and a high degree of crystallinity, maintaining the temperature during chlorination in a range of 70–130° C., at which temperature the partially chlorinated suspended polyethylene dissolves in the liquid medium at an increased rate as chlorination proceeds, maintaining a pressure of 1–20 atmospheres during chlorination, and carrying out the chlorination until the mixture of chlorinated polyethylene and chlorinated hydrocarbon of the aforesaid group has a chlorine content of 40–80% by weight.

12. Process of claim 11 wherein the liquid medium is a chlorinated paraffin of at least six carbon atoms.

13. As a new composition of matter, a mixture of halogenated hydrocarbons prepared by the process of claim 11.

References Cited in the file of this patent

UNITED STATES PATENTS

| | | |
|---|---|---|
| 2,181,158 | Sparks et al. | Nov. 28, 1939 |
| 2,268,415 | Morway | Dec. 30, 1941 |
| 2,398,803 | Myles | Apr. 23, 1946 |
| 2,481,188 | Babayan | Sept. 6, 1949 |
| 2,571,901 | Lawlor | Oct. 16, 1951 |
| 2,592,763 | Taylor | Apr. 15, 1952 |
| 2,748,105 | Becker et al. | May 29, 1956 |
| 2,870,113 | Jones | Jan. 20, 1959 |

FOREIGN PATENTS

| | | |
|---|---|---|
| 705,974 | Great Britain | Mar. 24, 1954 |